Dec. 23, 1924.  1,520,417

J. HUBICKI

INDICATOR

Filed Dec. 12, 1921  3 Sheets-Sheet 1

J. Hubicki
INVENTOR

BY Victor J. Evans
ATTORNEY

WITNESS:

Dec. 23, 1924.
J. HUBICKI
INDICATOR
Filed Dec. 12, 1921
1,520,417
3 Sheets-Sheet 2
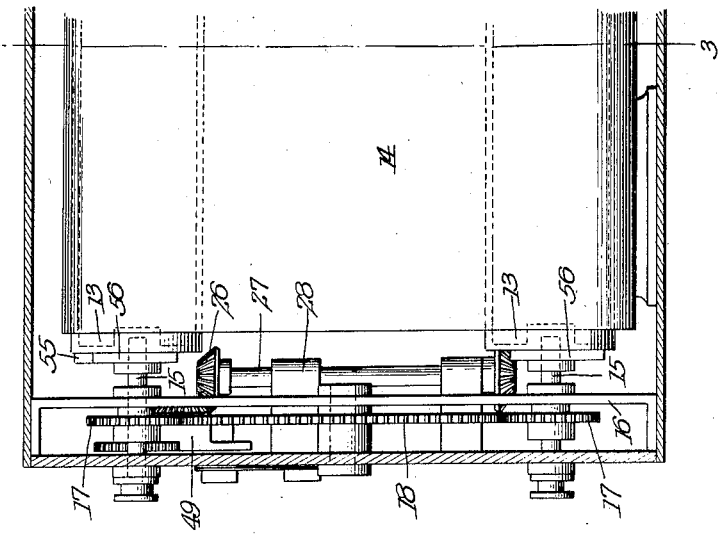
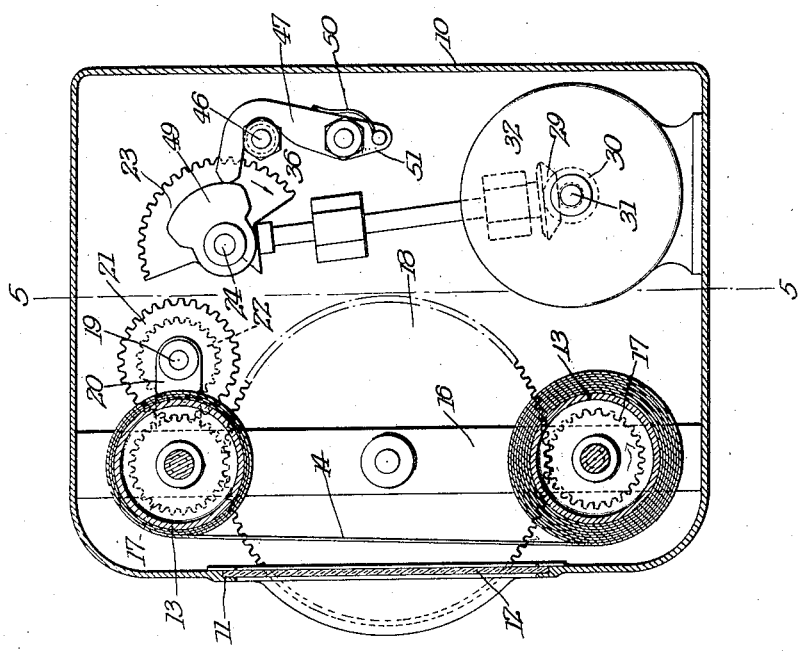

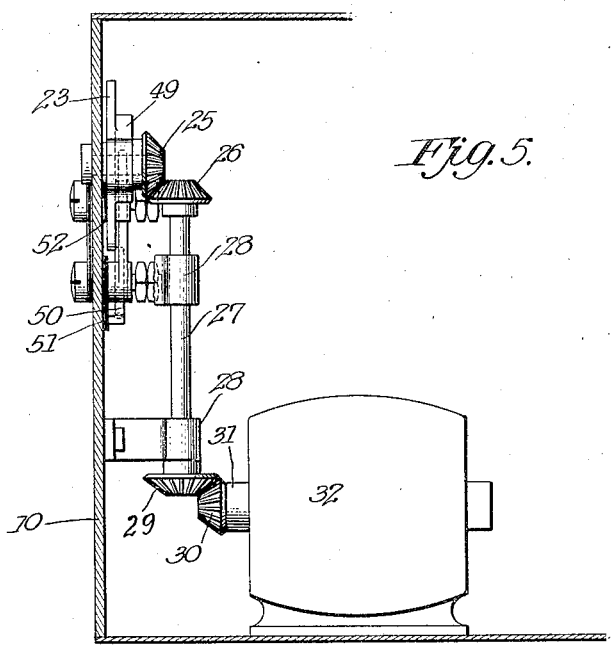
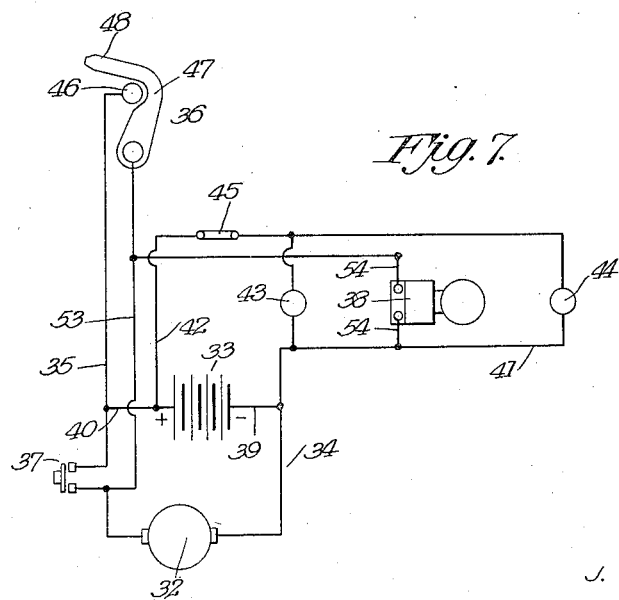

Patented Dec. 23, 1924.

1,520,417

UNITED STATES PATENT OFFICE.

JOSEPH HUBICKI, OF DETROIT, MICHIGAN.

INDICATOR.

Application filed December 12, 1921. Serial No. 521,702.

*To all whom it may concern:*

Be it known that I, JOSEPH HUBICKI, a citizen of Poland, residing at Detroit, in the county of Wayne and State of Michigan, have invented new and useful Improvements in Indicators, of which the following is a specification.

This invention relates to improvements in indicators and has for an object the provision of an indicator which is for use in street, railway cars or other vehicles for indicating an approaching street or station.

Another object of the invention is the provision of an indicator whose operation is controlled by a conductor, motorman or other employee, to successively indicate the names of streets or stations along the route of travel, the indicator including an audible signal which is operated by the indicator mechanism to notify passengers of a change in the name of a street or station displayed.

Another object of the invention is the provision of an indicator possessing the above and other advantages, which is simple of construction, positive in operation and in which the parts are readily accessible for the purpose of changing the indicator curtain, or for purposes of attention and repair.

With the above and other objects in view, the invention further includes the following novel features and details of construction, to be hereinafter more fully described, illustrated in the accompanying drawings and pointed out in the appended claim.

In the drawing:—

Figure 3 is a sectional view on the line 3—3 of Figure 4.

Figure 4 is a fragmentary section taken longitudinally through one end of the indicator.

Figure 5 is a section on the line 5—5 of Figure 3.

Figure 7 is a diagrammatic view of the electric circuits.

Figure 1:
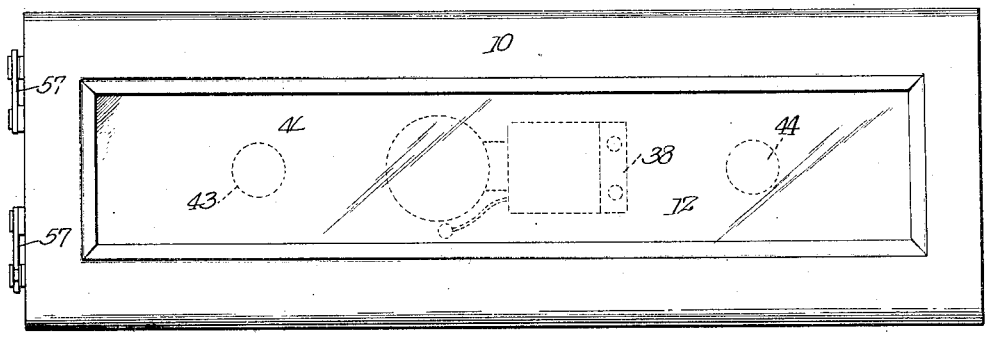
Figure 1 is a front elevation of the indicator.
Figure 2:
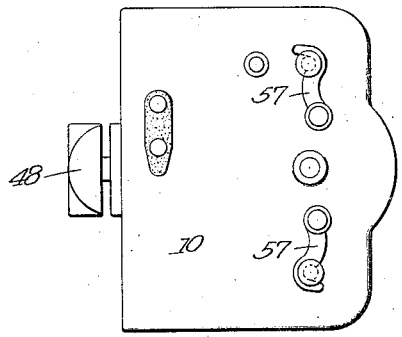
Figure 2 is an end view of the same.
Figure 6:
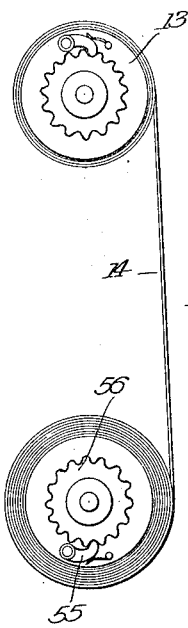
Figure 6 is an end view of the curtain rollers detached from the casing and showing a curtain wound thereon.

Referring to the drawings in detail, wherein like characters of reference denote corresponding parts, the reference character 10 indicates a casing which may be provided with a suitable door or opening (not shown) so that access may be had to the interior of the casing. The casing is further provided with a sight opening 11, within which is arranged a glass or other transparent panel 12.

Located within the casing upon opposite sides of the sight opening 11 are rollers 13, upon which is adapted to be wound a strip or curtain 14, having suitable indicia thereon representing the names of streets or stations along the route of travel of the car or other vehicle, upon which the indicator is used. These rollers 13 are mounted upon shafts 15 having bearings in brackets 16 arranged at each end of the casing. The shafts 15 at one end of the casing have secured thereon pinions 17, the pinion of each shaft being engaged by a gear 18, so that the shafts will be rotated simultaneously in the same direction. Mounted upon a stub shaft 19 having a bearing in a bracket arm 20, is a gear 21, which engages one of the pinions 17. Also mounted upon the shaft 19 is a pinion 22, which is adapted to be engaged by a segmental gear 23 which is mounted on a short shaft 24, the latter having a suitable bearing in the end of the casing 10. Also mounted upon the shaft 24 is a beveled pinion 25, which is engaged by a beveled pinion 26 secured to one end of a shaft 27. This last mentioned shaft is rotatable in bearings 28 and has secured to its opposite end a beveled pinion 29. This last mentioned pinion is engaged by a beveled pinion 30 mounted upon the shaft 31 of a reversible motor 32.

As thus far described, it will be apparent that when the motor 32 is operated, the segmental gear 23 will engage the pinion 22 so to rotate the rollers 17 and cause the curtain 14 to travel over the sight opening 11 for a distance covered by the engagement of the segmental gear 23 with the pinion 22. The parts are so proportioned that during this period of engagement, the name of the station or street will be changed.

The motor 32 is operated from a suitable source of current, for example, a battery 33, the latter being connected in parallel in the circuit which includes conductors 34 and 35. The conductors 34 and 35 are located upon opposite sides of an automatically operated switch 36, while included in series with the switch 36 and the motor 32 is a normally open spring switch 37. Also connected in parallel with the motor circuit is an audible signal in the form of a bell 38. The battery 33 is connected in the motor circuit by conductors 39 and 40 which are tapped respectively upon the conductors 34 and 35, while connected in circuit with the battery 33 by conductors 41 and 42, are lamps 43, the latter being connected by a conductor 44 in which is included a manually operated switch 45. This provides an independent circuit for the lamps which is controlled by the switch 45 so that the latter may remain lighted as long as desired.

The automatically operated switch 36 includes a stationary contact 46, which is adapted to be engaged by a pivotally mounted hook-shaped contact 47, the bill 48 of which is located in the path of a cam 49, which latter is mounted upon the shaft 24. The contact 47 is urged in a direction toward the cam 49 for the purpose of closing the switch 36, through the medium of a spring 50. The spring 50 is mounted upon an insulating block 51, so that it will be insulated from the casing 10, while a stationary contact 46 is likewise insulated, as indicated at 52.

In the operation of the indicator, after a street or station has been passed the switch 37, which may be an ordinary push button, is operated to close the motor circuit. Current will then flow from the battery through the conductor 40, the conductor 35, the switch 37, through the motor 32, the conductor 34, the conductor 39 to the opposite side of the battery. The motor will thus be operated to rotate the gear 23 and operate the rollers 17 in the manner previously stated. Assuming that the gear 23 is moving in the direction of the arrow shown in Figure 3, the cam 49 will be disengaged from the contact 47 when the opposite end of the cam is reached. This will permit the switch 36 to close under the influence of the spring 50, whereupon pressure upon the switch 37 may be released and the latter permitted to open. Current will then flow from the battery 33 through the conductor 40, the conductor 35, the switch 36, a conductor 53, the motor 32, the conductor 34 and the conductor 35 to the opposite side of the battery. Current will also flow from the switch 36 through the conductor 34, the conductor 39 to the negative side of the battery 33 and through conductors 54, which bridge the conductor 34 so as to include the alarm device 38 in parallel with the circuit.

As soon as the cam 49 again engages the bill of the contact 47, the latter will be separated from the contact 46 to open the circuit and stop the operation of both the motor and the alarm device. The parts are so proportioned and arranged that this opening of the circuit through the switch 36 will occur when the next succeeding station has been properly displayed before the sight opening 11 of the casing 10. As the lamp circuit is controlled through the manual operation of the switch 45, these lamps may be lighted to render the name of the station plainly discernable at night, and may be extinguished during the daylight hours.

In order to compensate for the differences in size of the curtain roll as it is unwound from one roller 17 upon the other roller, the rollers are yieldingly locked to their shafts 15 through the medium of a pawl 55 and a toothed wheel 56, the teeth of the latter being rounded, as is also the bill of the pawl, so that slippage between the shaft 14 and the roller is permitted. In addition, these rollers are removable, to permit of a change of curtain, or for other purposes. To provide for this, the shafts 15 are slidable longitudinally in their bearings and are held against accidental longitudinal movement through the medium of hooks 57, which are pivotally mounted upon the end of the casing 10 so as to engage annular grooves formed in the ends of the shafts 15, which project beyond the end of the casing.

By releasing these hooks and pulling the shafts outwardly, the rollers 17 with their curtain may be readily removed.

The invention is susceptible of various changes in its form, proportions and minor details of construction and the right is herein reserved to make such changes as properly fall within the scope of the appended claim.

Having described the invention what is claimed is—

A station indicator embodying a casing having a sight opening, an indicia bearing curtain movable therein across the opening, rollers journaled in the casing upon which the curtain is adapted to be wound, a gearing operatively connecting the rollers, a motor included in a normally open circuit with a source of current, a segmental gear pivoted in the casing to move parallel to the plane of rotation of the rollers, a cam element fixed to move with the segmental gear, driving connections between the motor and segmental gear, manually operated means whereby to close the circuit to the motor to operate the segmental gear and cause the same to engage certain of the gearing to rotate the rollers a predetermined time, a fixed contact included in the motor circuit, a pivoted contact normally engaging the fixed contact and having one end disposed in the path of movement of the cam and adapted to be moved away from the fixed contact to break the circuit to the motor by the cam after the segmental gear has moved away from the gearing.

JOSEPH HUBICKI.